(12) United States Patent
Ravella et al.

(10) Patent No.: US 11,873,008 B2
(45) Date of Patent: Jan. 16, 2024

(54) CONTROLLING A VEHICLE BASED ON DATA PROCESSING OF WEIGHTS AT AXLES OF THE VEHICLE

(71) Applicant: PlusAI, Inc., Cupertino, CA (US)

(72) Inventors: Siva Bhargav Ravella, Santa Clara, CA (US); Xiaoyu Huang, San Jose, CA (US); Amit Kumar, Sunnyvale, CA (US)

(73) Assignee: PlusAI, Inc., Cupertino, CA (US)

( * ) Notice: Subject to any disclaimer, the term of this patent is extended or adjusted under 35 U.S.C. 154(b) by 0 days.

(21) Appl. No.: 17/710,182

(22) Filed: Mar. 31, 2022

(65) Prior Publication Data

US 2023/0311943 A1    Oct. 5, 2023

(51) Int. Cl.
*B60W 60/00* (2020.01)
*B60W 10/22* (2006.01)
*B60W 40/13* (2012.01)
*B60W 40/076* (2012.01)
*B60W 40/105* (2012.01)
*B60W 30/04* (2006.01)
(Continued)

(52) U.S. Cl.
CPC ........ *B60W 60/0015* (2020.02); *B60W 10/22* (2013.01); *B60W 30/04* (2013.01); *B60W 30/146* (2013.01); *B60W 40/076* (2013.01); *B60W 40/105* (2013.01); *B60W 40/13* (2013.01); *B60W 50/16* (2013.01); *B60W 60/0053* (2020.02); *B60W 60/0059* (2020.02); B60W 2040/1307 (2013.01); B60W 2040/1315 (2013.01); B60W 2050/143 (2013.01); B60W 2050/146 (2013.01); B60W 2300/126 (2013.01); B60W 2420/503 (2013.01); B60W 2510/202 (2013.01); B60W 2520/18 (2013.01); B60W 2520/28 (2013.01); B60W 2540/18 (2013.01); B60W 2552/15 (2020.02); B60W 2710/22 (2013.01)

(58) Field of Classification Search
CPC ..................................... B60W 40/13
See application file for complete search history.

(56) References Cited

U.S. PATENT DOCUMENTS

| 2006/0085112 A1* | 4/2006 | Lu ......................... B60W 40/10 701/38 |
| 2007/0017727 A1* | 1/2007 | Messih ................. B60W 40/13 180/282 |

(Continued)

*Primary Examiner* — Imran K Mustafa
(74) *Attorney, Agent, or Firm* — Sheppard Mullin Richter & Hampton LLP (57) ABSTRACT

A representation of a first set of weights associated with a vehicle prior to a drive are received, the vehicle including a plurality of axles, a plurality of wheels attached to the plurality of axles, and a load. A warning is caused to be output in response to at least one weight from the first set of weights being outside a predetermined range. Longitudinal and lateral dynamics associated with the vehicle during the drive are determined. A second set of weights associated with at least one axle from the plurality of axles during the drive are determined. A determination is made if at least one remedial action should be performed based on the longitudinal dynamics, the lateral dynamics, and the second set of weights. In response to determining that the at least one remedial action should be performed, the at least one remedial action is caused to be performed.

20 Claims, 5 Drawing Sheets

(51) Int. Cl.
  *B60W 30/14*  (2006.01)
  *B60W 50/16*  (2020.01)
  *B60W 50/14*  (2020.01)

(56) References Cited

U.S. PATENT DOCUMENTS

| | | | |
|---|---|---|---|
| 2009/0138191 A1* | 5/2009 | Engelhard | B60W 40/13 |
| | | | 340/440 |
| 2018/0265076 A1* | 9/2018 | Hall | B60W 10/06 |
| 2019/0255903 A1* | 8/2019 | Hirao | B60G 17/06 |
| 2020/0055521 A1* | 2/2020 | Pearson | B60W 40/13 |
| 2020/0180608 A1* | 6/2020 | Kim | B60W 30/16 |
| 2020/0317212 A1* | 10/2020 | Rogness | B60W 40/13 |
| 2021/0061302 A1* | 3/2021 | Hashizume | G05D 1/0223 |
| 2021/0347369 A1* | 11/2021 | Owen | B60W 50/0097 |
| 2021/0370985 A1* | 12/2021 | Lee | B60W 60/0053 |

\* cited by examiner

Receive, by a processor, a set of weights associated with a vehicle prior to a drive, the vehicle including a plurality of axles and a plurality of wheels attached to the plurality of axles
502

Determine, by the processor, if at least one remedial action should be performed during the drive based on the set of weights and at least one of: (1) output from an air spring suspension system included in the vehicle indicating weights associated with the plurality of axles during the drive, (2) a difference between a vertical frequency value and a roll frequency value provided by a frequency response function associated with a center of gravity of the vehicle during the drive, (3) a height change associated with the vehicle between a height prior to the drive and a height during the drive, (4) a tire pressure change between a tire pressure associated with the plurality of wheels prior to the drive and a tire pressure associated with the plurality of wheels during the drive, or (5) a relative wheel speed difference between at least one first wheel from the plurality of wheels and at least one second wheel from the plurality of wheels during the drive
504

In response to determining that the at least one remedial action should be performed, cause, by the processor, the at least one remedial action to be performed
506

Figure 5

CONTROLLING A VEHICLE BASED ON DATA PROCESSING OF WEIGHTS AT AXLES OF THE VEHICLE

FIELD

In one or more embodiments, a vehicle can be controlled to perform one or more remedial actions based on data processing of weights at axles of the vehicle before and/or while the vehicle is moving.

BACKGROUND

Vehicles, such as trucks, occasionally haul loads. These loads can sometimes move around within the vehicle, altering the weight distribution between various portions of the vehicle. Thus, these loads can pose risks to the vehicles. For example, in some instances, the vehicle can become unbalanced, where an axle and/or portion of an axle holds more weight than other axles and/or portions of other axles. As another example, an unsecure load can slide around in the vehicle, potentially causing damage to the load and altering the weight distribution at the vehicle. As another example, the load can cause an axle and/or portion of the axle to hold too much weight, increasing the likelihood of blowing out a tire. Thus, a need exists for controlling a vehicle to perform a remedial action(s) when such loads occur.

SUMMARY

In an embodiment, a method includes receiving, by a processor, a representation of a first set of weights associated with a vehicle prior to a drive, the vehicle including a plurality of axles, a plurality of wheels attached to the plurality of axles, and a load. A warning is caused to be output by the processor in response to at least one weight from the first set of weights being outside a predetermined range. Longitudinal and lateral dynamics associated with the vehicle during the drive are determined by the processor. A second set of weights associated with at least one axle from the plurality of axles during the drive are determined by the processor based on at least one of: (1) output from an air spring suspension system included in the vehicle, (2) a difference between a vertical frequency value and a roll frequency value provided by a frequency response function associated with a center of gravity of the vehicle during the drive, (3) a height change associated with the vehicle between a height prior to the drive and a height during the drive, (4) a tire pressure change between a tire pressure associated with the plurality of wheels prior to the drive and a tire pressure associated with the plurality of wheels during the drive, or (5) a relative wheel speed difference between at least one first wheel from the plurality of wheels and at least one second wheel from the plurality of wheels during the drive. A determination is made by the processor if at least one remedial action should be performed based on the longitudinal dynamics, the lateral dynamics, and the second set of weights. In response to determining that the at least one remedial action should be performed, the at least one remedial action is caused to be performed by the processor.

In an embodiment, a method includes receiving, by a processor, a first set of weights associated with a vehicle prior to a drive, the vehicle (1) including a plurality of axles and a plurality of wheels attached to the plurality of axles, and (2) not including an air spring suspension system. At least one first remedial action is caused to be performed, by the processor, in response to at least one weight from the first set of weights being outside a predetermined range. Longitudinal and lateral dynamics associated with the vehicle during the drive are determined by the processor. A second set of weights associated with at least one axle from the plurality of axles during the drive are determined by the processor based on at least one of: (1) a difference between a vertical frequency value and a roll frequency value provided by a frequency response function associated with a center of gravity of the vehicle during the drive, (2) a height change associated with the vehicle between a height prior to the drive and a height during the drive, (3) a tire pressure change between a tire pressure associated with the plurality of wheels prior to the drive and a tire pressure associated with the plurality of wheels during the drive, or (4) a relative wheel speed difference between at least one first wheel from the plurality of wheels and at least one second wheel from the plurality of wheels during the drive. A determination is made by the processor if at least one second remedial action should be performed based on the longitudinal dynamics, the lateral dynamics, and the second set of weights. In response to determining that the at least one second remedial action should be performed, the at least one second remedial action is caused to be performed by the processor.

In an embodiment, a method includes receiving, by a processor, a set of weights associated with a vehicle prior to a drive, the vehicle including a plurality of axles and a plurality of wheels attached to the plurality of axles. A determination is made by the processor if at least one remedial action should be performed during the drive based on the set of weights and at least one of: (1) output from an air spring suspension system included in the vehicle indicating weights associated with the plurality of axles during the drive, (2) a difference between a vertical frequency value and a roll frequency value provided by a frequency response function associated with a center of gravity of the vehicle during the drive, (3) a height change associated with the vehicle between a height prior to the drive and a height during the drive, (4) a tire pressure change between a tire pressure associated with the plurality of wheels prior to the drive and a tire pressure associated with the plurality of wheels during the drive, or (5) a relative wheel speed difference between at least one first wheel from the plurality of wheels and at least one second wheel from the plurality of wheels during the drive. In response to determining that the at least one remedial action should be performed, the at least one remedial action is caused to be performed by the processor.

DETAILED DESCRIPTION

Vehicles, such as heavy trucks, can carry loads. These loads can pose risks to vehicles. For example, an unsecure load can move around within the vehicle, thereby increasing a likelihood of causing the vehicle to rollover, causing the vehicle to sway, causing the vehicle to fishtail, etc. As another example, the load can cause the vehicle to become unbalanced (e.g., where one part of the vehicle is heavier than another part of the vehicle), thereby increasing a likelihood of causing the vehicle to rollover, causing the vehicle to sway, causing the vehicle to fishtail, etc. As another example, the load can cause all and/or portions of the vehicle to be heavier than desirable (i.e., overweight), thereby increasing a likelihood of blowing out a tire, causing the vehicle to be in an accident, etc.

In some instances, the risks associated with an unbalanced, unsecure, and/or overweight load are aggravated for heavy trucks (e.g., vehicles weighting greater than 26,000 pounds) due to their heavy weight, large size, and high center of gravity. In some instances, the risks associated with an unbalanced, unsecure, and/or overweight loads are mitigated when weight is equally distributed between the left side of the vehicle and the right side of the vehicle. In some instances, for a vehicle that includes a tractor pulling a trailer, the risks associated with an unbalanced, unsecure, and/or overweight load are mitigated when a front axle of the trailer is carrying more weight than a rear axle of the trailer.

In some implementations, the techniques described herein relate to determining an estimated set of weights at the axles/left and right portions of the axles of a vehicle and/or trailer of the vehicle to detect unbalanced, unsecure, and/or overweight loads. Furthermore, in response to detecting an unbalanced, unsecure, and/or overweight load, a remedial action(s) can be executed.

In some implementations, an unbalanced load can refer to a load that causes a vehicle to have a non-optimal weight distribution (e.g., a left side of the vehicle has too much weight relative to the right side of the vehicle, or the rear trailer axle has too much weight relative to the front trailer axle). In some implementations, an unsecure load can refer to a load that is not secure within a vehicle (e.g., furniture that is sliding around in a cargo bed, a set of boxes that have broken lose from a restraint system such as straps attached to the vehicle walls). In some implementations, an overweight load can refer to a load that causes a weight at an axle and/or portion of an axle of the vehicle to be greater than an allowable weight limit (e.g., predefined by a manufacturer and/or third-party).

Figure 1:
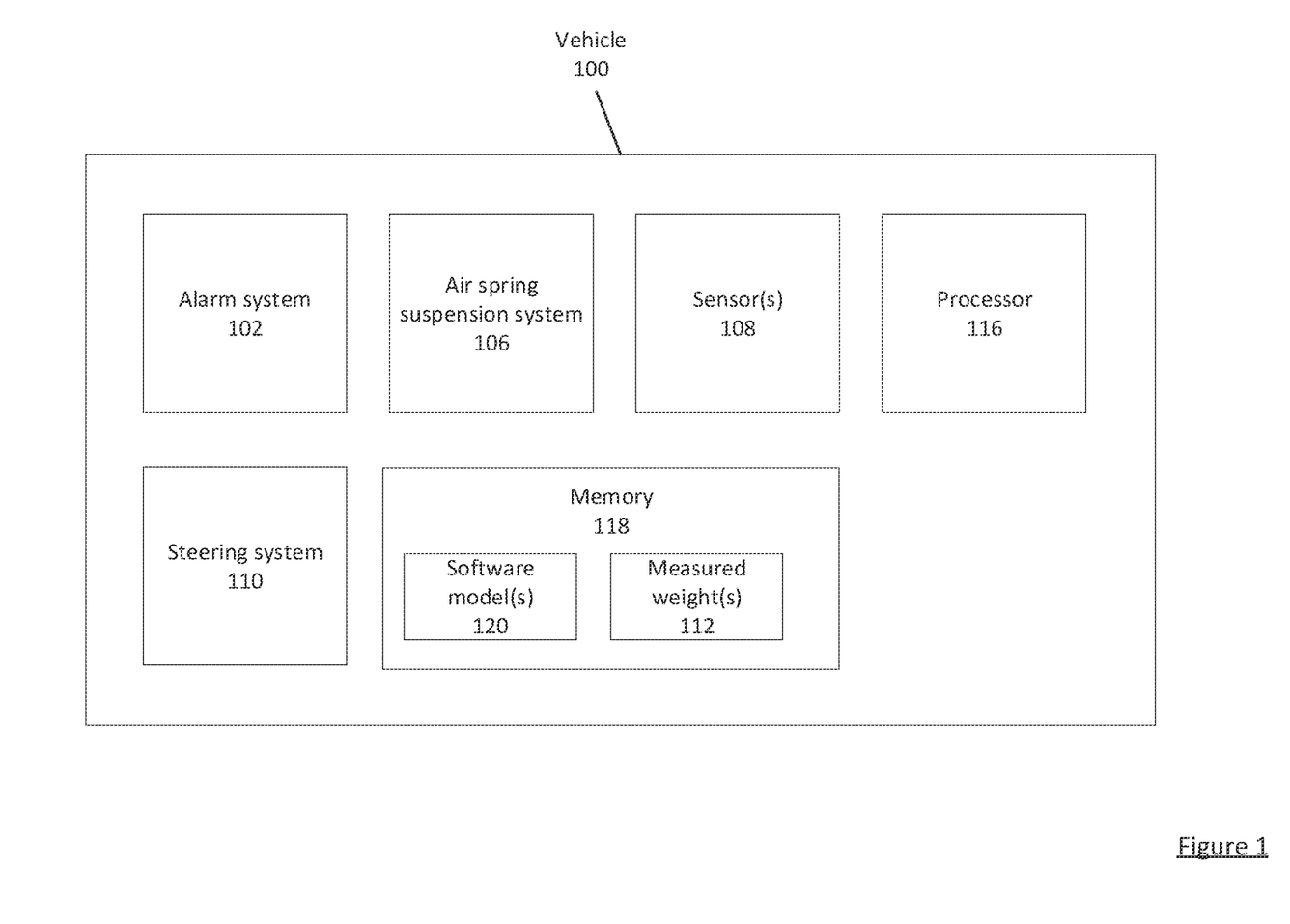
FIG. 1 shows a block diagram for a vehicle that can be controlled based on data processing of weights associated with axles of the vehicle, according to an embodiment.

Referring now to the drawings, FIG. 1 shows a block diagram of a vehicle 100, according to an embodiment. The vehicle 100 includes an alarm system 102, air spring suspension system 106, sensor(s) 108, steering system 110, processor 116, and memory 118. The alarm system 102, air spring suspension system 106, sensor(s) 108, processor 116, steering system 110, and memory 118 can be operatively coupled to one another (e.g., via a system bus; not shown). In some implementations, the vehicle 100 is able to operate in an autonomous driving mode, semi-autonomous driving mode, manual driving mode, or a combination thereof. In some implementations, the vehicle 100 is capable of and operates in only an autonomous driving mode (and not a semi-autonomous driving mode nor manual driving mode). In some implementations, the vehicle 100 is capable of and operates in only a semi-autonomous driving mode (and not an autonomous driving mode nor manual driving mode). In some implementations, the vehicle 100 is capable of and operates in only a manual driving mode (and not an autonomous driving mode nor semi-autonomous driving mode). In some implementations, the vehicle 100 is a heavy truck (e.g., weighs over 26,000 pounds).

Occasionally, the vehicle 100 hauls a load (not shown in FIG. 1), where the load can be anything that the vehicle 100 can haul, such as raw materials, liquids, furniture, animals, etc. In some instances, the load may cause weights at the axles and/or portions of the axles of the vehicle 100 to be greater than a predefined limit and/or have an undesirable weight distribution. As the vehicle 100 drives, the load may move around. As a result, the weights at the axles/wheels of the vehicle 100 can change. In some implementations, the vehicle 100 includes a tractor attached to a trailer, and the load is included in the trailer. The trailer can be any type of trailer, such as a standard trailer, spread-axle trailer, double trailer, etc.

The sensor(s) 108 can include one or more sensors for collecting sensor data. The sensor(s) 108 can be used to observe and gather any information that would be useful for performing the techniques discussed herein, such as information associated with the vehicle 100 itself and/or associated with a surrounding environment of the vehicle 100. Sensor(s) 108 can include, for example, a camera, a radar, a lidar, and/or a tire pressure sensor. The sensor(s) 108 can collect sensor data that includes representations of attributes associated with the vehicle 100 (e.g., speed, location, acceleration, size, weight, tire pressure, torque of steering wheel, angle of steering wheel, vehicle height, wheel speed, etc.), and/or a surrounding of the vehicle 100 (e.g., speed, location, acceleration, size, type, relative distance, etc. of other vehicles, pedestrians, animals, signs, obstacles, lane markers, shoulder areas, etc.).

The steering system 110 includes components for steering the vehicle 100, such as a steering wheel, brake pedal, acceleration pedal, engine, etc. The steering system 110 can be used to control navigation of the vehicle 100, such as turning, accelerating, decelerating, stopping, etc. In a scenario where a load is determined to be unbalanced, unsecure, and/or overweight, the processor 116 may send a signal (e.g., automatically without requiring input from the driver) to cause the steering system 110 to perform at least one remedial action, such as decelerating or navigating to a shoulder area.

The vehicle 100 also includes axles (not shown in FIG. 1). Each axle includes a left portion and a right portion. Tires (not shown in FIG. 1) are fit on wheels (not shown in FIG. 1), and the wheels are attached to the axles. For each axle, at least one wheel is attached to that axle's left portion, and at least one other wheel is attached to that axle's right portion. The vehicle 100 can have a plurality of axles (e.g., two, three, four, five). For example, the vehicle 100 can include a front axle and a rear axle. In some implementations, the vehicle 100 can include at least four axles. For example, if the vehicle 100 includes a tractor and a trailer, the tractor can include two axles, and the trailer can include two axles. As another example, the tractor can have two or three axles, and the trailer can have two or three axles.

The air spring suspension system 106 is a suspension system that can be included in the vehicle 100. The air spring suspension system 106 can include an air pump or compressor, where the air pump or compressor can pump air into flexible bellows (not shown in FIG. 1) of the air spring suspension system 106. The air can inflate the bellows and raise a chassis (not shown in FIG. 1) of the vehicle 100 from the axles. In some implementations, the vehicle 100 does not include the air spring suspension system 106. There are advantages and disadvantages to using an air spring suspension system 106. Advantages can sometimes include reduced vibration and/or reduced noise. Disadvantages can sometimes include reduced fuel efficiency and/or increased vulnerability to air leaks.

The processor 116 can be, for example, a hardware based integrated circuit (IC) or any other suitable processing device configured to run and/or execute a set of instructions or code. For example, the processor 116 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 116 can be configured to run any of the methods and/or portions of methods discussed herein.

The memory 118 can be, for example, a random-access memory (RAM), a memory buffer, a hard drive, a read-only memory (ROM), an erasable programmable read-only memory (EPROM), and/or the like. The memory 118 can be configured to store sensor data collected by the sensor(s) 108, data from and/or associated with air spring suspension system 106, data from and/or associated with steering system 110, data received from a separate compute device (not shown in FIG. 1), and/or any other data used by the processor 116 to perform the techniques discussed herein. In some instances, the memory 118 can store, for example, one or more software programs and/or code that can include instructions to cause the processor 116 to perform one or more processes, functions, and/or the like. In some embodiments, the memory 118 can include extendible storage units that can be added and used incrementally. In some implementations, the memory 118 can be a portable memory (for example, a flash drive, a portable hard disk, and/or the like) that can be operatively coupled to the processor 116. In some instances, the memory 118 can be remotely operatively coupled with the compute device. For example, a remote database device (not shown) can serve as a memory and be operatively coupled to the vehicle 100.

The memory 118 stores an indication of measured weight(s) 112 of the vehicle 100. The measured weight(s) 112 can be measured when the vehicle 100 (including the load) is not driving. In some implementations, the measured weight(s) 112 can include indications of weights at each axle of the vehicle 100, weights at the left and right portions of each axle of the vehicle 100, and/or a total weight of the vehicle 100. In some implementations, the vehicle 100 includes a tractor and a trailer, and the measured weight(s) 112 can (1) include indications of weights at each axle of the trailer and weights at the left and right portions of each axle of the trailer, and/or (2) not include indications of weights at the axles of the tractor. In some implementations, the measured weight(s) 112 can be captured at a scale, such as a certified CAT scale, and then provide to vehicle 100 for storage in memory 118.

The memory 118 also stores a software model(s) 120. The software model(s) 120 can be, for example, an artificial intelligence (AI) or machine learning (ML) model(s). The software model(s) 120 can be used to estimate weights at at least one axle and/or left and right portions of at least one axle as the vehicle 100 drives. The software model(s) 120 can also be used to determine whether a load carried by the vehicle 100 is unbalanced, unsecure, and/or overweight based on the estimated weights and/or sensor data collected by the sensor(s) 108. The software model(s) 120 can also determine if one or more remedial actions should be taken in response to determining that a load is unbalanced, unsecure, and/or overweight. Furthermore, the software model(s) 120 can analyze sensor data collected by the sensor(s) 108 to determine if a load is protruding from the vehicle 100 (e.g., from the trailer). For example, a camera can capture images and/or video of one or more sides of the vehicle 100, and the software model(s) 120 can analyze the images and/or video to determine if a load is protruding. As another example, a lidar can be used to scan one or more sides of the vehicle 100, and the software model(s) 120 can analyze data captured during the scan to determine if a load is protruding.

The software model(s) 120 can estimate a set of weight associated with the at least one axle as the vehicle 100 drives (i.e., is moving). In some implementations, the estimated set of weights includes estimated weights at the axles and/or portions of the axles (i.e., left portion and right portion of each axle) for the entire vehicle 100. For example, if the vehicle 110 includes a front axle and a rear axle, the software model(s) 120 can estimate a weight at the front left axle, the front right axle, the rear left axle, and the rear right axle, as well as a weight at the front axle (e.g., by adding the weight at the front left axle and the weight at the front right axle), and rear axle (e.g., by adding the weight at the rear left axle and the weight at the rear right axle). In some implementations, where the vehicle 100 includes a tractor and a trailer, the estimated set of weights includes estimated weights at the axles and/or portions of the axles (i.e., left portion and right portion of each axle) for the trailer (and not the tractor). For example, if the vehicle 100 includes a tractor with a front and rear axle, and a trailer with a front and rear axle, the software model(s) 120 can estimate a weight at the front and rear axles of the trailer without estimating a weight at the front and rear axles of the tractor.

In some implementations, the estimated set of weights include absolute values (e.g., 1,050 pounds at front left axle, 950 pounds at front right axle, 1,000 pounds at rear right axle, and 975 pounds at rear left axle). In some implementations, the estimated set of weights include relative values (e.g., 30% of total weight at front left axle, 25% of total weight at front right axle, 25% of total weight at rear right axle, and 20% of total weight at rear left axle). In some implementations, absolute values of weights at the axles and/or left and right portions of the axles can be estimated using the measured weight(s) 112 and relative values of weights at the axles and/or left and right portions of the axles. For example, if 60% of the total weight is at the front axle during a drive, 40% of the total weight is at the back axle during the drive, and the total weight of the vehicle 100 was measured to be 30,000 pounds prior to the drive, the software model(s) 120 can approximate that 18,000 pounds are at the front axle and 12,000 pounds are at the rear axle.

In some implementations, the software model(s) 120 can estimate the set of weights associated with the axles as the vehicle 100 drives using the air spring suspension system 106. The air spring suspension system 106 can output air pressure values near the left and right portions of each axle. The air pressure values can then be used by the software model(s) 120 to estimate an absolute and/or relative set of weight at the left and right portions of axles that are of interest.

In some implementations, the software model(s) 120 can estimate the set of weights associated with the axles (as the vehicle 100 drives) using a frequency response function associated with a center of gravity of the vehicle 100. The frequency response function associated with the center of gravity indicates a vertical frequency of the vehicle 100 and a roll frequency of the vehicle 100. A vertical frequency value provided by the frequency response function and a roll frequency value provided by the frequency response function can indicate a weight distribution of the vehicle 100, and a difference between the vertical frequency value and the roll frequency value being outside a predetermined range can indicate that an abnormal weight distribution exists.

In some implementations, the software model(s) 120 can estimate the set of weights associated with the axles (as the vehicle 100 drives) by analyzing a height change associated with the vehicle 100. In some implementations, the sensor(s) 108 can collect sensor data indicating a set of heights at various points of the vehicle 100 when the vehicle 100 is not moving, such as the highest points of the vehicle 100 above the left and right portions of axles that are of interest (e.g., all axles of the vehicle 100, only axles at a trailer of the vehicle 100). Knowing heights at these various points of the vehicle 100, as well as weights at various points of the vehicle 100 (via the measured weight(s) 112), a set of weights can be estimated as the vehicle 100 is driving by analyzing changes in height at the various points of the vehicle. Knowing that additional weight decreases height, a set of weights including absolute and/or relative values can be estimated based on the change in height at the various points and/or the measured weight(s) 112.

In some implementations, the software model(s) 120 can estimate the set of weights associated with the axles by analyzing a tire pressure change between tires included in the vehicle 100. In some implementations, tire pressures values can be captured at each tire of the vehicle 100 prior to driving, and again during driving. Knowing that adding weight at a tire could increase that tire's pressure, a tire pressure increase during driving can indicate that additional weight has been added near that tire (and vice versa). The amount of tire pressure increase and/or decrease, along with the measured weight(s) 112, can be used to estimate the set of weights.

In some implementations, the software model(s) 120 can estimate the set of weights associated with the axles by analyzing a relative wheel speed difference between two or more wheels included in the vehicle 100. Weight can cause a tire of the vehicle 100 to compress, which can cause a radius/diameter of the tire/wheel to change. A smaller radius/diameter can mean the tire/wheel needs to rotate faster relative to a tire/wheel with a larger radius/diameter (and vice versa). In some implementations, the sensor(s) 108 can capture sensor data indicating wheel speeds at each wheel of the vehicle 100 and/or each wheel of a trailer included in the vehicle 100, and the software model(s) 120 can analyze the wheel speeds to determine if differences exist. If differences do not exist, weights at the axles/left and right portions of the axles are likely to be similar to the measured weight(s) 112. If, however, differences do exist, weights at the axles/left and right portions of the axles are likely to have deviated from the measured weight(s) 112 (e.g., where wheels with faster wheel speeds have larger weights compared to wheels with slower wheel speeds). Furthermore, the amount of difference in wheel speed between wheels can also be used, along with the measured weight(s) 112, to estimate absolute and/or relative values for the set of weights.

Note that any of the above-mentioned techniques for estimating the set of weights associated with the axles can be used individually and/or in a combination. In some implementations, the set of weights associated with the axles can be estimated based on at least one of (e.g., only one, at least two, at least three, at least four, or all five): (1) output from an air spring suspension system included in the vehicle, (2) a difference between a vertical frequency value and a roll frequency value provided by a frequency response function associated with a center of gravity of the vehicle as the vehicle moves, (3) a height change associated with the vehicle between a height prior to the vehicle moving and a height as the vehicle is moving, (4) a tire pressure change between a tire pressure associated with the plurality of wheels prior to the vehicle moving and a tire pressure associated with the plurality of wheels as the vehicle is moving, or (5) a relative wheel speed difference between wheels of the vehicle as the vehicle is moving. For example, the set of weights associated with the axles can be estimated using relative wheel speed difference and tire pressure difference (and optionally, also the temperature of the associated tire, where increasing temperature increases pressure (and vice versa)).

The software model(s) 120 can determine that a load is unbalanced, unsecure, and/or overweight using the set of estimated weights during a drive. Recall that the estimated set of weights can include estimated weights at one or more axles and/or left and right portions of one or more axles included in the vehicle 100. Thus, how the estimated weight values are distributed across the vehicle 100 can indicate whether a load is unbalanced, a change in the weight values at an axle and/or portion of the axle can indicate whether a load is unsecure, and the weight values themselves can indicate whether a load is putting too much weight at an axle and/or portion of an axle. For example, the load may be unsecure (e.g., sliding around in a trailer of the vehicle 100) if the front axle of the vehicle 100 holds 5,000 pounds at one point during a drive, but hold 8,000 pounds at another point during the drive. As another example, the load may be unbalanced if the set of estimated weights indicates that one axle is holding substantially more weight than another axle, a left portion of an axle is holding substantially more weight than a right portion of that axle, the right portion of an axle is holding substantially more weight than the left portion of that axle, etc. As another example, the load may be overweight if an axle and/or portion of the axle is holding an absolute weight value greater than a predetermined limit (e.g., 4,250 pounds, 6,000 pounds, 8,500 pounds, 12,000 pounds).

In some implementations, the processor 116 can use the software model(s) 120 and/or sensor data collected from the sensor(s) 108 to determine dynamics of the vehicle 100 during a drive. The dynamics of the vehicle 100, measured weight(s) 112, and/or estimated set of weights during the drive can then be used to determine if at least one remedial action should be performed.

Determining dynamics of the vehicle 100 can include determining, by the processor 116, longitudinal dynamics and lateral dynamics of the vehicle 100. Longitudinal dynamics can indicate longitudinal forces at the vehicle 100 and can be determined based on the measured weight(s) 112 (e.g., total weight of the vehicle 100), a speed of the vehicle 100, an acceleration of the vehicle 100, a grade of a road where the vehicle 100 is travelling in during a drive, a powertrain inverse model, etc. Lateral dynamics can indicate lateral forces at the vehicle 100 and can be determined based on the measured weight(s) 112 (e.g., total weight of the vehicle 100), a speed of the vehicle 100, an acceleration of the vehicle 100, a bank angle of a road the vehicle is travelling on during a drive, a roll angle of the vehicle, a steering wheel angle of a steering wheel included in the steering system 110, a steering wheel torque of the steering wheel, etc.

Using the estimated set of weights and determined dynamics (e.g., longitudinal dynamics and lateral dynamics), the software model(s) 120 can determine if at least one remedial action should be performed. In some implementations, the software model(s) 120 can determine that at least one remedial action should be performed if the estimated set of weights indicates that trailer swaying, fishtailing, and/or a rollover is likely. In some implementations, if the estimated set of weights indicates that one or more axles and/or portions of an axle have a weight outside an acceptable range (e.g., greater than 20,000 pounds at an axle, greater than 10,000 pounds at a left or right portion of an axle), the software model(s) 120 can determine that at least one remedial action should be performed. In some implementations, if the estimated set of weights indicates that one or more axles and/or portions of an axle have an undesirable weight distribution, the software model(s) 120 can determine that at least one remedial action should be performed. An undesirable weight distribution can refer to, for example, one portion of an axle holding substantially more weight than another portion of that axle, or a first axle (e.g., rear axle) holding more weight than a second axle (e.g., front axle) in front of the first axle.

In one example, if the dynamics indicate the vehicle 100 is making a sharp turn to the right, it may be undesirable for the right side of the vehicle 100 to make up a large proportion of the vehicle's 100 total weight; in such a case, the software model(s) 120 may determine that a remedial action is desirable. As another example, if the dynamics indicate the vehicle 100 is travelling very slowly on a flat and straight road, the software model(s) 120 may determine that a remedial action is not necessary, even if some axles and/or portions of axles are associated with more weight than other axles and/or portions of axles.

In some implementations, a remedial action is performed if a left portion of an axle is carrying substantially more weight (e.g., more than 5%, more than 10%, more than 20%, etc.) than a right portion of that axle. In some implementations, a remedial action is performed if a right portion of an axle is carrying substantially more weight (e.g., more than 5%, more than 10%, more than 20%, etc.) than a left portion of that axle. In some implementations, (1) the vehicle 100 includes a tractor and trailer, (2) the trailer includes a front axle and rear axle, and (3) a remedial action is performed if the rear axle is carrying more weight than the front axle or the front axle is not carrying substantially more weight (e.g., more than 5%, more than 10%, more than 20%, etc.) than the rear axle. In some implementations, a remedial action is performed if the software model(s) 120 determines from analyzing sensor data collected by the sensor(s) 108 that the load is protruding.

In some implementations, the at least one remedial action includes automatically decreasing a speed of the vehicle 100 without requiring human input (e.g., without having the driver press down the brakes). In some implementations, the processor 116 can send a signal to the steering system 110 to cause the vehicle 100 to slow down to a speed beneath a predetermined speed limit if the vehicle 100 is travelling faster than the predetermined speed limit.

In some implementations, the at least one remedial action includes automatically causing the vehicle 100 to adjust at least one of the longitudinal dynamics or lateral dynamics without requiring human input (e.g., without having the driver press down less on the accelerator pedal). For example, the processor 116 can send a signal to the steering system 110 to cause the vehicle 100 to decrease the vehicle's speed and/or acceleration. As another example, the processor can send a signal to the steering system 110 to cause the vehicle 100 to decrease a roll angle of the vehicle and/or a steering wheel angle of a steering wheel included in the steering system 110.

In some implementations, the at least one remedial action includes automatically navigating the vehicle 100 to a predetermined safe location without requiring human input (e.g., without having the driver adjust the steering wheel). In some implementations, the predetermined safe location can be a safe place to stop, such as a shoulder or parking lot. In some implementations, the predetermined safe location can be a road with less turns, flatter bank, less traffic, lower speed limit, etc.

In some implementations, the at least one remedial action includes alerting a driver of the vehicle 100 using the alarm system 102. The alarm system 102 can include at least one of a display, a speaker, or a vibration device (e.g., a buzzer). The display can output information visually to the driver so that the driver is provided context that a potential issue is present, what the potential issue is, what remedial action is being performed, and/or recommended actions for the driver, etc. The speaker can output information audibly to the driver so that the driver is provided context that a potential issue is present, what the potential issue is, what remedial action is being performed, and/or recommended actions for the driver, etc. The vibration device can cause vibrations to be felt by the driver, which can be used to increase the driver's alertness and/or notify the driver of a potential issue.

In some implementations, the at least one remedial action includes causing hazard lights of the vehicle 100 to be turned on using the alarm system 102. The alarm system 102 can also include hazard lights, and the processor 116 can send a signal to the alarm system 102 to cause the hazard lights to be activated.

In some implementations, the vehicle 100 is operating in a first mode prior to performing the at least one remedial action, and the at least one remedial action causes the vehicle 100 to operate and/or initiate a process to operate in a second mode different than the first mode. The first mode could be four-wheel drive, two-wheel drive, an autonomous driving mode, a semi-autonomous driving mode, a manual driving mode, cruise control, etc. The second mode could be four-wheel drive, two-wheel drive, an autonomous driving mode, a semi-autonomous driving mode, a manual driving mode, cruise control, etc.

In some implementations, the vehicle 100 is operating in an autonomous driving mode prior to performing the at least one remedial action, and the at least one remedial action initiates causing a driver of the vehicle 100 to perform a series of tasks to cause the vehicle 100 to operate in a manual driving mode if the driver performs the series of tasks. In some implementations, a set of tasks used to switch the vehicle from operating in the autonomous driving mode to the manual driving mode are determined, and the set of tasks are made known to the driver via the alarm system 102. Additional details related to performing a series of tasks to switch an operating mode of the vehicle 100 are discussed in U.S. Patent Publication Number 2020/0192360, the contents of which are incorporated by reference herein in its entirety.

In some implementations, the vehicle 100 is operating in a first mode prior to performing the at least one remedial action, and the at least one remedial action causes the vehicle 100 to be prevented from and/or refrain from operating in a second mode different than the first mode. The first mode could be four-wheel drive, two-wheel drive, an autonomous driving mode, a semi-autonomous driving mode, a manual driving mode, cruise control, etc. The second mode could be four-wheel drive, two-wheel drive, an autonomous driving mode, a semi-autonomous driving mode, a manual driving mode, cruise control, etc. In some implementations, the vehicle 100 is refrained from operating in the second mode until the software model(s) 120 determines that the load is not unbalanced, unsecured, and/or overweight.

Figure 2:
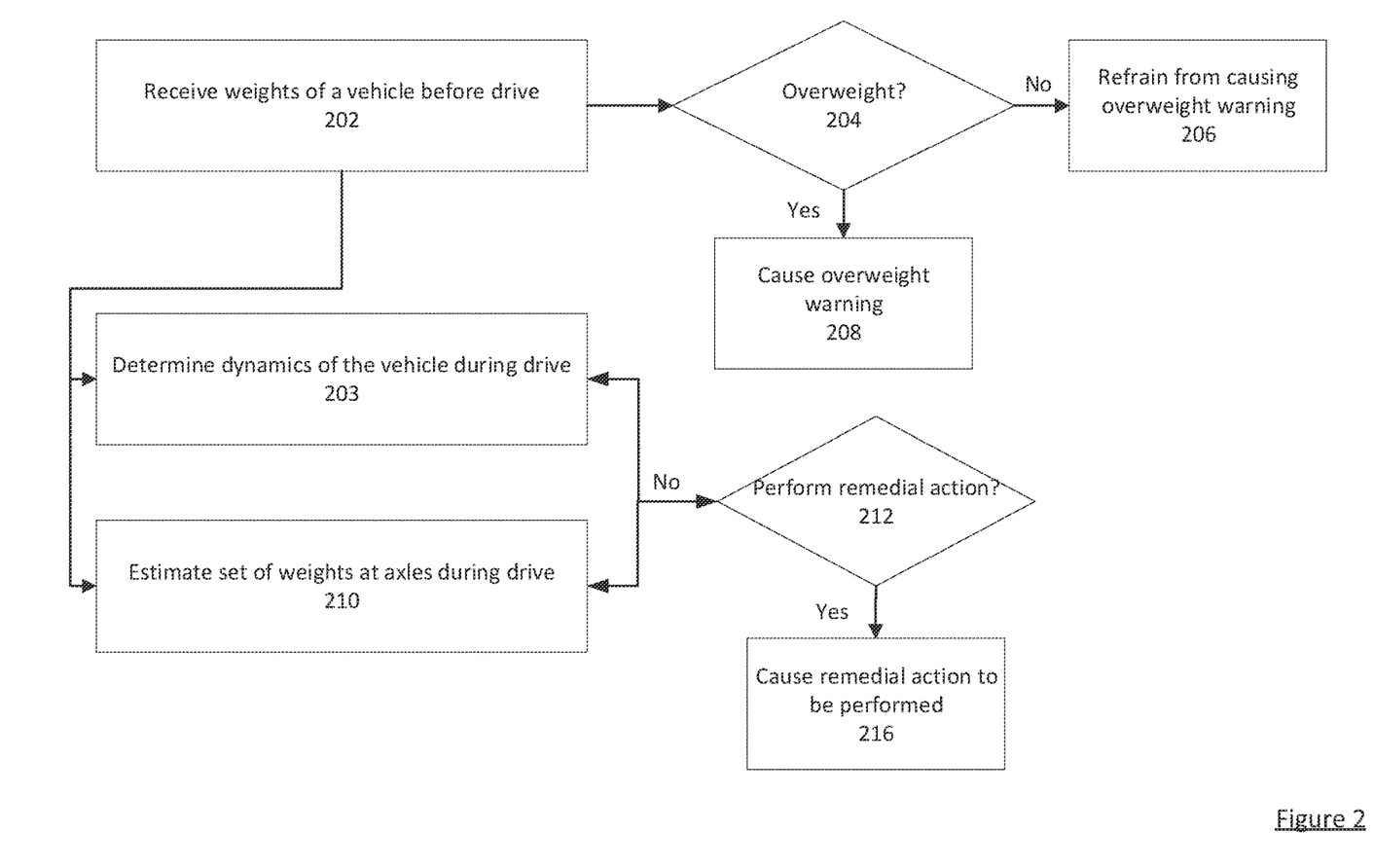
FIG. 2 shows a flow diagram for controlling a vehicle based on weights associated with axles of the vehicle, according to an embodiment.

FIG. 2 shows a diagram for performing actions based on weights associated with a vehicle, according to an embodiment. In some implementations, the techniques discussed with respect to FIG. 2 can be performed by the processor 116 of the vehicle 100 from FIG. 1.

At 202, a first set of weights (e.g., measured weight(s) 112) of a vehicle (e.g., vehicle 100) are received before a drive (e.g., when the vehicle is not moving). The first set of weights of the vehicle can include at least one of a total weight of the vehicle, a weight at at least one axle of the vehicle (e.g., each axle of the vehicle, axles of only a trailer and not the tractor), a weight at the left portion of at least one axle of the vehicle, and/or a weight at the right portion of at least one axle of the vehicle. The first set of weights can be captured using a scale (e.g., when the vehicle is stationary). Thereafter, the first set of weights can be provided to the processor (e.g., processor 116) of the vehicle, for example, via input from a driver or a signal from a compute device associated with the scale received wirelessly at the processor via a communication interface (not shown in FIG. 1).

At 204, a determination is made as to whether or not any of the first set of weights received at 202 are overweight. In some implementations, this includes determining if the total weight of the vehicle is outside a predetermined range. In some implementations, this includes determining if the weight carried at an axle vehicle is outside a predetermined range. In some implementations, this includes determining if the weight carried at a left portion or right portion of an axle is outside a predetermined range. In some implementations, the predetermined range of weights can be defined beforehand by a manufacturer of the vehicle and/or a third-party (e.g., state government, federal government).

If 204 is yes, the processor causes an overweight warning to be delivered at 208 (e.g., using the alarm system 102). The overweight warning can indicate that the vehicle is overweight, which axle is overweight, which portion of the axle is overweight, how overweight the vehicle, axle, and/or portion of the axle is, etc. In some implementations, the overweight warning can be delivered automatically (e.g., without requiring additional human input). If 204 is no, the processor at 206 refrains from causing an overweight warning to be delivered.

Once the vehicle has started driving (i.e., moving), dynamics of the vehicle are determined (e.g., automatically) at 203. The dynamics can include lateral and longitudinal dynamics associated with the vehicle as the vehicle drives. The dynamics can be determined based on the weights received at 202, speed of the vehicle, acceleration of the vehicle, bank angle of a road the vehicle is driving in, a grade of the road, a roll angle of the vehicle, a steering wheel angle, a steering wheel torque, or a combination thereof.

Before, during, and/or after 203, a second set of weights at axles of the vehicle are estimated at 210 (e.g., using software model(s) 120). The estimated second set of weights can include an estimated weight at at least one axle of the vehicle, an estimated weight at the left portion of at least one axle of the vehicle, and/or an estimated weight at the right portion of at least one axle of the vehicle. The second set of weights can be repeatedly estimated as the vehicle is driving (e.g., continuously, periodically or non-periodically). The second set of weights can be estimated using the first set of weights received at 202, output from an air spring suspension system (e.g., air spring suspension system 106), a difference between a vertical frequency value and a roll frequency value provided by a frequency response function associated with a center of gravity of the vehicle, a height change at one or more points of the vehicle (e.g., before the drive versus during the drive), a tire pressure change at one or more tires of the vehicle (e.g., before the drive versus during the drive), a relative wheel speed difference between wheels of the vehicle, or a combination thereof. In some implementations, where the vehicle includes a tractor and a trailer, the second set of weights are estimated only using sensors included in the tractor, and not with any sensors included in the trailer. This can allow the tractor to estimate the second set of weights for different trailers that may be attached to the tractor.

At 212, the second set of weights estimated at 210 and dynamics determined at 203 are used to determine if a remedial action should be performed. The second set of weights estimated at 210 can indicate current weights at the axles and/or left and right portions of the axles, and the dynamics determined at 203 can help to predict if a remedial action is recommended or necessary. In some implementations, if any of the weights in the second set of weights are outside a predetermined range of weights, a remedial action can be performed. In some implementations, if any of the weights in the second set of weights indicates that swaying, fishtailing, or rollover of the vehicle is likely, a remedial action can be performed. In some implementations, if one side of an axle holds substantially more weight than another side of that axle, a remedial action can be performed. In some implementations, if a first axle of the vehicle (e.g., the rear-most axle) is heavier than a second axle of the vehicle (e.g., an axle in front of the rear-most axle), a remedial action can be performed. In some implementations, if any of the weights in the second set of weights are not outside a predetermined range of weights, but the dynamics determined at 203 indicate that at least one weight from the second set of weights are likely going to be outside the predetermined range of weights, a remedial action can be performed.

If 212 is yes, the processor can cause at least one remedial action to be performed at 216. In some implementations, if 212 is yes, the at least one remedial action is performed automatically without requiring human (e.g., driver) input. If 212 is no, a remedial action is not performed. In some instances, if 212 is no, the processor returns to 203 and 210.

Figure 3:
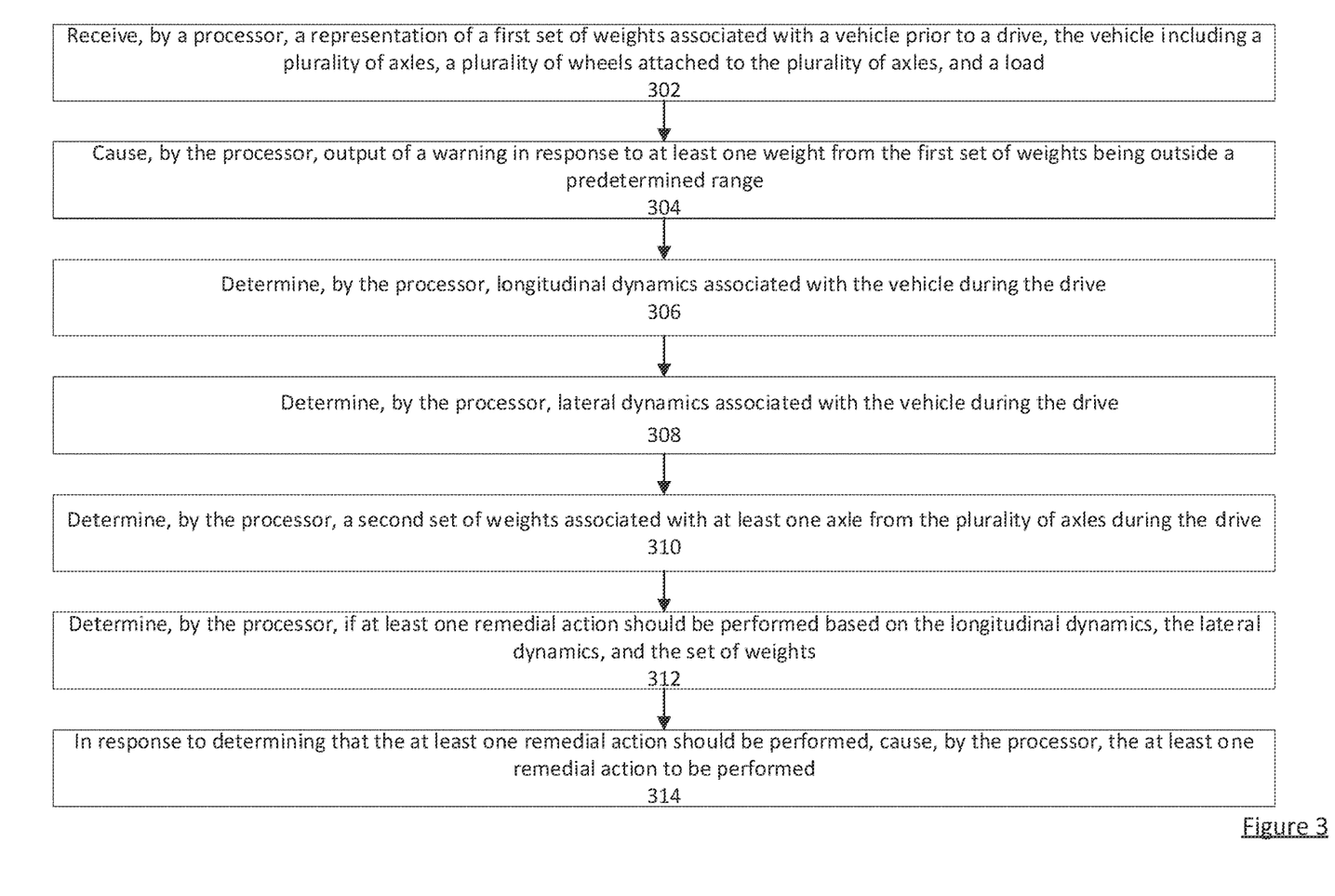
FIG. 3 shows a flowchart of a method for controlling a vehicle based on dynamics of the vehicle and weights associated with axles of the vehicle, according to an embodiment.

FIG. 3 shows a flowchart of a method for determining if at least one remedial action should be performed based on one or more weights associated with axles of a vehicle, according to an embodiment. In some implementations, the method discussed with respect to FIG. 3 can be performed by a processor (e.g., processor 116).

At 302, a representation of a first set of weights of a vehicle (e.g., vehicle 100) are received prior to a drive. In some implementations, the vehicle includes a plurality of axles, a plurality of wheels attached to the plurality of axles, and a load. The first set of weights are of the vehicle when the vehicle is not driving (i.e., not moving). In some implementations, the first set of weights include at least one of a total weight of the vehicle, a weight at at least one axle from the plurality of axles, a weight at the left portion of at least one axle from the plurality of axles, or a weight at the right portion of at least one axle from the plurality of axles. The first set of weights can be made known by a scale (e.g., CAT scale), and a representation of the first set of weights can be sent to the processor of the vehicle (e.g., input by a human, sent as a signal from a compute device associated with the scale).

At 304, a warning is caused to output in response to at least one weight from the first set of weights being outside a predetermined range. For example, if the total weight of the vehicle is outside a predetermined range, a warning is caused to output. As another example, if the weight at a first axle of the vehicle is outside a first predetermined range, and/or the weight at a second axle of the vehicle different than the first axle is outside a second predetermined range different than the first predetermined range, a warning is caused to output. As another example, if the weight at the left or right portion of an axle is outside a predetermined range, a warning is caused to be output. Each of the predetermined ranges can be determined based on government laws, manufacturer recommendations, third-party recommendations, etc. In some implementations, the warning is caused to output in response to at least one weight from the first set of weights being outside a predetermined range automatically (e.g., without requiring human input.

At 306, longitudinal dynamics associated with the vehicle during the drive are determined (e.g., automatically). The longitudinal dynamics can be determined continuously and/or repeatedly based on the first set of weight, a current speed of the vehicle, a current acceleration of the vehicle, a grade of a road where the vehicle is travelling in during the drive, or a combination thereof.

At 308, lateral dynamics associated with the vehicle during the drive are determined (e.g., automatically). The lateral dynamics can be determined continuously and/or repeatedly based on the first set of weights, a current speed of the vehicle, a current acceleration of the vehicle, a bank angle of a road where the vehicle is travelling in during the drive, a roll angle of the vehicle, a steering wheel angle of a steering wheel included in the vehicle, a steering wheel torque of the steering wheel, or a combination thereof.

At 310, a second set of weights associated with at least one axle from the plurality of axles during the drive are determined (e.g., automatically). The second set of weights associated with the at least one axle can include representations of a total weight at at least one axle from the plurality of axles, a weight at the left portion of at least one axle from the plurality of axles, a weight at the right portion of at least one axle from the plurality of axles, or a combination thereof. In some implementations, where the vehicle includes a tractor and a trailer, the second set of weights (1) can include a weight at each axle of the trailer, a left portion of each axle of the trailer, and a right portion of each axle of the trailer, and/or (2) does not include any weights of axles at the tractor. In some implementations, the second set of weights can be determined using a software model (e.g., software model(s) 120), sensor data (e.g., collected from sensor(s) 108), the first set of weights received at 302, or a combination thereof. In some implementations, the second set are weights are determined using at least one of (1) output from an air spring suspension system included in the vehicle, (2) a difference between a vertical frequency value and a roll frequency value provided by a frequency response function associated with a center of gravity of the vehicle during the drive, (3) a height change associated with the vehicle between a height prior to the drive and a height during the drive, (4) a tire pressure change between a tire pressure associated with the plurality of wheels prior to the drive and a tire pressure associated with the plurality of wheels during the drive, or (5) a relative wheel speed difference between at least one first wheel from the plurality of wheels and at least one second wheel from the plurality of wheels during the drive. In some implementations, where the vehicle includes a tractor and a trailer, the second set of weights are estimated only using sensors included in the tractor, and not with any sensors included in the trailer. This can allow the tractor to estimate the second set of weights for different trailers that may be attached to the tractor.

At 312, a determination is made if at least one remedial action should be performed based on the longitudinal dynamics determined at 306, the lateral dynamics determined at 308, and/or the second set of weights determined at 310. In some implementations, the first set of weights can indicate current weights at at least one axle and/or left and right portions of the axle, and the dynamics determined at 306 and/or 308 can help to predict how the second set of weights may change. In some implementations, if any of the weights in the second set of weights are and/or are predicted to be outside a predetermined range of weights (e.g., predetermined by third party or manufacturer associated with the vehicle), a remedial action can be performed. In some implementations, if the second set of weights indicates that swaying, fishtailing, or rollover of the vehicle is likely, a remedial action can be performed. In some implementations, if one side of an axle holds and/or will likely hold substantially more weight (e.g., 5%, 10%, 20%) than another side of that axle, a remedial action can be performed. In some implementations, if a first axle holds or will likely hold more weight than a second axle of the vehicle, a remedial action can be performed.

At 314, in response to determining that the at least one remedial action should be performed, the at least one remedial action is caused to be performed (e.g., automatically). In some implementations, the processor sends a signal to an alarm system (e.g., alarm system 102) and/or steering system (e.g., steering system 110) to initiate the at least one remedial action to be performed.

Figure 4:
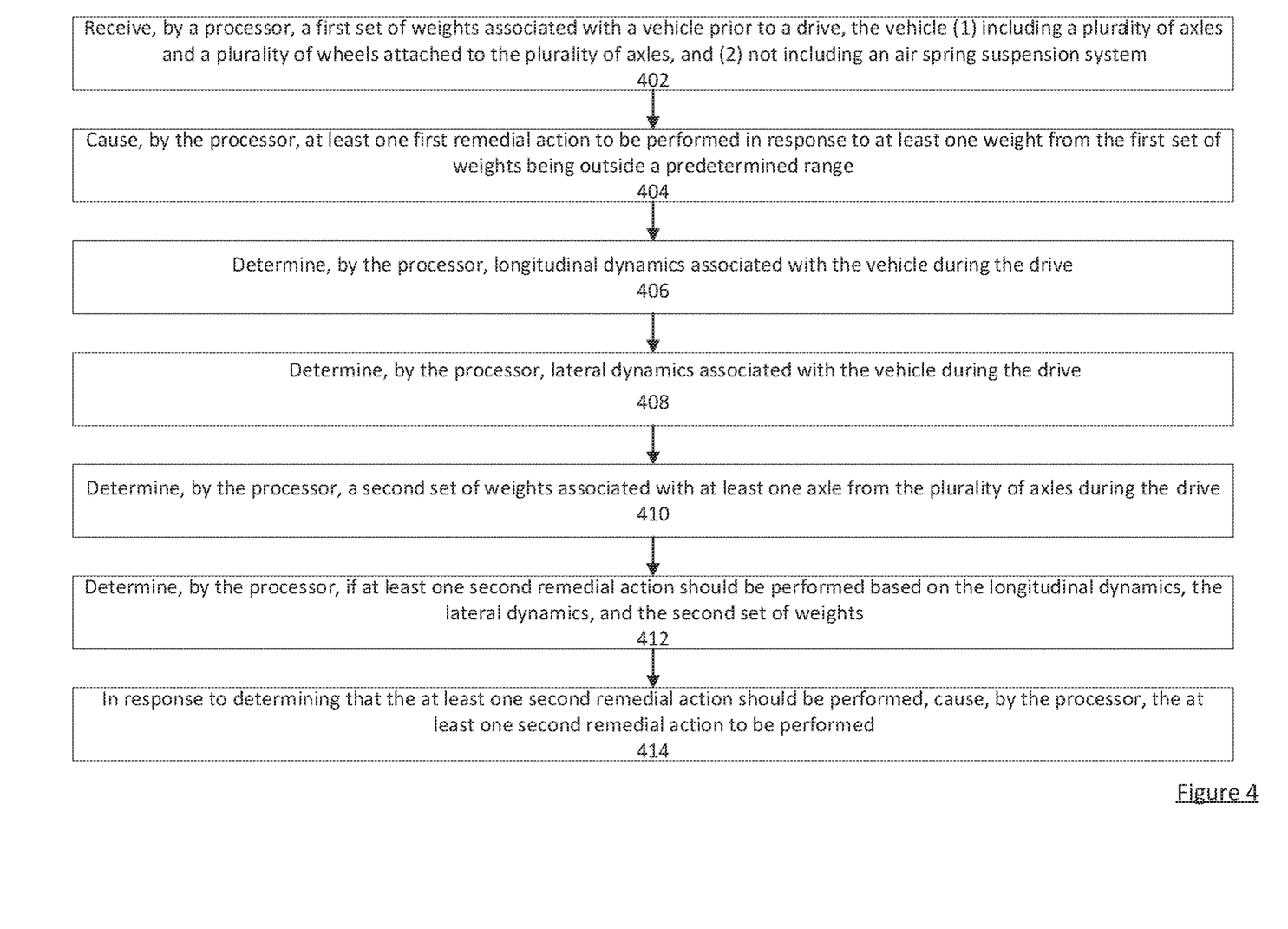
FIG. 4 shows a flowchart of a method for controlling a vehicle based on dynamics of the vehicle and weights associated with axles of the vehicle, according to an embodiment.

FIG. 4 shows a flowchart of a method for determining if at least one remedial action should be performed based on one or more weights associated with axles of a vehicle, according to an embodiment. In some implementations, the method discussed with respect to FIG. 4 can be performed by a processor (e.g., processor 116).

At 402, a first set of weights of a vehicle (e.g., vehicle 100) are received prior to a drive, the vehicle (1) including a plurality of axles and a plurality of wheels attached to the plurality of axles, and (2) not including an air spring suspension system (e.g., air suspension system 106). The first set of weights are of the vehicle when the vehicle is not driving (i.e., not moving). In some implementations, the first set of weights include at least one of a total weight of the vehicle, a weight at at least one axle from the plurality of axles, a weight at the left portion of at least one axle from the plurality of axles, or a weight at the right portion of at least one axle from the plurality of axles. The first set of weights can be made known by a scale (e.g., CAT scale), and a representation of the first set of weights can be sent to the processor of the vehicle (e.g., input by a human, sent as a signal from a compute device associated with the scale).

At 404, at least one first remedial action is caused to be performed in response to at least one weight from the first set of weights being outside a predetermined range. For example, if the total weight of the vehicle is outside a predetermined range, the at least one first remedial action is caused to be performed. As another example, if the weight at a first axle of the vehicle is outside a first predetermined range, and/or the weight at a second axle of the vehicle different than the first axle is outside a second predetermined range different than the first predetermined range, the at least one first remedial action is caused to be performed. As another example, if the weight at the left or right portion of an axle is outside a predetermined range, the at least one first remedial action is caused to be performed. Each of the predetermined ranges can be determined based on laws, manufacturer recommendations, third-party recommendations, etc. The at least one first remedial action can be any type of remedial action, such as outputting a warning to a driver and/or passenger of the vehicle, preventing the vehicle from performing certain driving maneuvers (e.g., sharp turns, accelerating too quickly), etc.

At 406, longitudinal dynamics associated with the vehicle during the drive are determined (e.g., automatically). The longitudinal dynamics can be determined continuously and/or repeatedly during the drive based on the first set of weight, a current speed of the vehicle, a current acceleration of the vehicle, a grade of a road where the vehicle is travelling in during the drive, or a combination thereof.

At 408, lateral dynamics associated with the vehicle during the drive are determined (e.g., automatically). The lateral dynamics can be determined continuously and/or repeatedly based on the first set of weights, a current speed of the vehicle, a current acceleration of the vehicle, a bank angle of a road where the vehicle is travelling in during the drive, a roll angle of the vehicle, a steering wheel angle of a steering wheel included in the vehicle, a steering wheel torque of the steering wheel, or a combination thereof.

At 410, a second set of weights associated with at least one axle from the plurality of axles during the drive are determined (e.g., automatically). The second set of weights associated with the at least one axle can include representations of a total weight at at least one axle from the plurality of axles, a weight at the left portion of at least one axle from the plurality of axles, a weight at the right portion of at least one axle from the plurality of axles, or a combination thereof. In some implementations, where the vehicle includes a tractor and a trailer, the second set of weights can (1) include a weight at each axle of the trailer, a left portion of each axle of the trailer, and a right portion of each axle of the trailer and/or (2) does not include any weights of axles at the tractor. In some implementations, the second set of weights can be determined using a software model (e.g., software model(s) 120), sensor data (e.g., collected from sensor(s) 108), the first set of weights received at 302, or a combination thereof. In some implementations, the second set are weights are determined using at least one of (1) a difference between a vertical frequency value and a roll frequency value provided by a frequency response function associated with a center of gravity of the vehicle during the drive, (2) a height change associated with the vehicle between a height prior to the drive and a height during the drive, (3) a tire pressure change between a tire pressure associated with the plurality of wheels prior to the drive and a tire pressure associated with the plurality of wheels during the drive, or (4) a relative wheel speed difference between at least one first wheel from the plurality of wheels and at least one second wheel from the plurality of wheels during the drive. In some implementations, where the vehicle includes a tractor and a trailer, the second set of weights are estimated only using sensors included in the tractor, and not with any sensors included in the trailer. This can allow the tractor to estimate the second set of weights for different trailers that may be attached to the tractor.

At 412, a determination is made if at least one second remedial action should be performed based on the longitudinal dynamics determined at 406, the lateral dynamics determined at 408, and/or the second set of weights determined at 410. In some implementations, the first set of weights can indicate current weights at the axles and/or left and right portions of the axles, and the dynamics determined at 406 and/or 408 can help to predict how the second set of weights may change. In some implementations, if any of the weights in the second set of weights are and/or are likely to be outside a predetermined range of weights, the at least one second remedial action can be performed. In some implementations, if the second set of weights indicates that swaying, fishtailing, or rollover of the vehicle is likely, the at least one second remedial action can be performed. In some implementations, if one side of an axle holds and/or will likely hold substantially more weight (e.g., 5%, 10%, 20%) than another side of that axle, the at least one second remedial action can be performed. In some implementations, if a first axle holds or will likely hold more weight than a second axle of the vehicle, the at least one second remedial action can be performed.

At 414, in response to determining that the at least one second remedial action should be performed, the at least one second remedial action is caused to be performed (e.g., automatically). In some implementations, the processor sends a signal to an alarm system (e.g., alarm system 102) and/or steering system (e.g., steering system 110) to initiate the at least one second remedial action to be performed.

Figure 5:
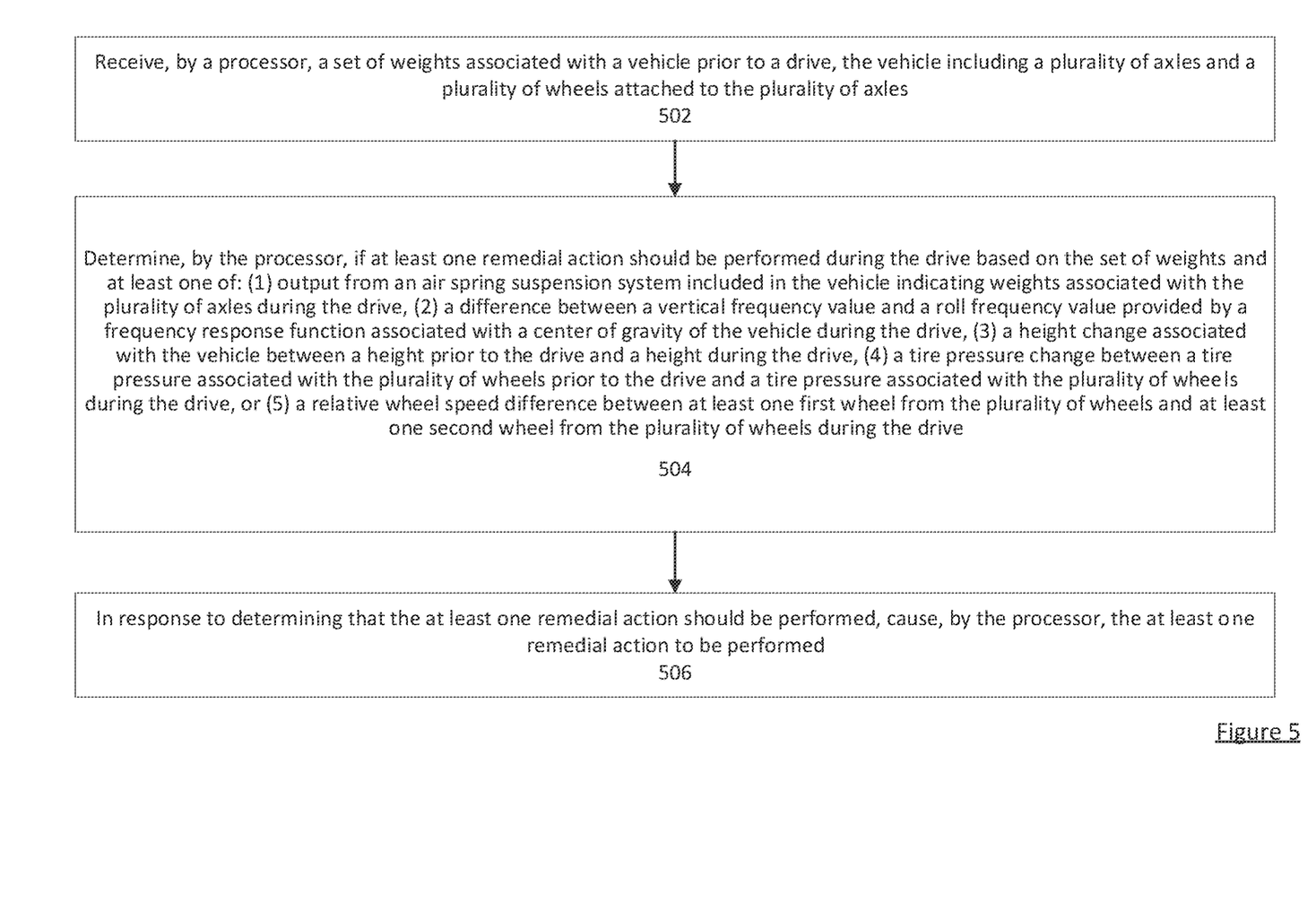
FIG. 5 shows a flowchart of a method for controlling a vehicle based on weights associated with axles of the vehicle, according to an embodiment.

FIG. 5 shows a flowchart of a method for determining if at least one remedial action should be performed based on one or more weights associated with axles of a vehicle, according to an embodiment. In some implementations, the method discussed with respect to FIG. 5 can be performed by a processor (e.g., processor 116).

At 502, a set of weights associated with a vehicle prior to a drive are received, the vehicle including a plurality of axles and a plurality of wheels attached to the plurality of axles. The set of weights are of the vehicle when the vehicle is not driving (i.e., not moving). In some implementations, the set of weights include at least one of a total weight of the vehicle, a weight at each axle from the plurality of axles, a weight at the left portion of each axle from the plurality of axles, or a weight at the right portion of each axle from the plurality of axles. The set of weights can be made known by a scale (e.g., CAT scale), and a representation of the set of weights can be sent to the processor of the vehicle (e.g., input by a human, sent as a signal from a compute device associated with the scale).

At 504, a determination is made if at least one remedial action should be performed during the drive (e.g., when the vehicle is moving) based on the set of weight received at 502 and at least one of: (1) output from an air spring suspension system included in the vehicle indicating weights associated with the plurality of axles during the drive, (2) a difference between a vertical frequency value and a roll frequency value provided by a frequency response function associated with a center of gravity of the vehicle during the drive, (3) a height change associated with the vehicle between a height prior to the drive and a height during the drive, (4) a tire pressure change between a tire pressure associated with the plurality of wheels prior to the drive and a tire pressure associated with the plurality of wheels during the drive, or (5) a relative wheel speed difference between at least one first wheel from the plurality of wheels and at least one second wheel from the plurality of wheels during the drive.

At 506, in response to determining that the at least one remedial action should be performed, the at least one remedial action is caused to be performed (e.g., automatically). In some implementations, the processor sends a signal to an alarm system (e.g., alarm system 102) and/or steering system (e.g., steering system 110) to initiate the at least one remedial action to be performed.

In some implementations, though not discussed with respect to FIG. 5, dynamics of the vehicle during the drive can be determined (e.g., longitudinal dynamics and/or lateral dynamics), and determining if at least one remedial action should be performed at 504 can be further based on the determined dynamics.

In some implementations, though not discussed with respect to FIG. 5, the vehicle includes a trailer hauling a load, and a determination is made that at least one one remedial action should be performed at 504 if the load is protruding from the trailer.

In an embodiment, a method comprises: receiving, by a processor, a representation of a first set of weights associated with a vehicle prior to a drive, the vehicle including a plurality of axles, a plurality of wheels attached to the plurality of axles, and a load; causing, by the processor, output of a warning in response to at least one weight from the first set of weights being outside a predetermined range; determining, by the processor, longitudinal dynamics associated with the vehicle during the drive; determining, by the processor, lateral dynamics associated with the vehicle during the drive; determining, by the processor, a second set of weights associated with at least one axle from the plurality of axles during the drive based on at least one of: (1) output from an air spring suspension system included in the vehicle, (2) a difference between a vertical frequency value and a roll frequency value provided by a frequency response function associated with a center of gravity of the vehicle during the drive, (3) a height change associated with the vehicle between a height prior to the drive and a height during the drive, (4) a tire pressure change between a tire pressure associated with the plurality of wheels prior to the drive and a tire pressure associated with the plurality of wheels during the drive, or (5) a relative wheel speed difference between at least one first wheel from the plurality of wheels and at least one second wheel from the plurality of wheels during the drive; determining, by the processor, if at least one remedial action should be performed based on the longitudinal dynamics, the lateral dynamics, and the second set of weights; and in response to determining that the at least one remedial action should be performed, causing, by the processor, the at least one remedial action to be performed.

In some implementations, the at least one remedial action includes automatically decreasing a speed of the vehicle without requiring human input during the drive.

In some implementations, the at least one remedial action includes automatically causing the vehicle to adjust at least one of the longitudinal dynamics or the lateral dynamics, without requiring human input.

In some implementations, the at least one remedial action includes automatically navigating the vehicle to a predetermined safe location without requiring human input.

In some implementations, the at least one remedial action includes alerting a driver of the vehicle via at least one of an audible notification, a visual notification, or a vibratory notification.

In some implementations, the vehicle is operating in an autonomous driving mode prior to the performing of the at least one remedial action, and the at least one remedial action initiates causing the vehicle to operate in a manual driving mode.

In some implementations, the vehicle is operating in a manual driving mode prior to the performing of the at least one remedial action, and the at least one remedial action inhibits the vehicle from operating in an autonomous driving mode.

In some implementations, the vehicle is an autonomous heavy truck.

In some implementations, the determining if the at least one remedial action should be performed is performed repeatedly until the drive has ended.

In some implementations, the vehicle further comprises at least one sensor to detect at least one of the height change or a position of the load.

In some implementations, the longitudinal dynamics are determined based on at least a portion of the first set of weights, a current speed of the vehicle, a current acceleration of the vehicle, and a grade of a road where the vehicle is travelling in during the drive.

In some implementations, the lateral dynamics are determined based on at least a portion of the first set of weights, a current speed of the vehicle, a current acceleration of the vehicle, and at least one of a bank angle of a road where the vehicle is travelling in during the drive, a roll angle of the vehicle, a steering wheel angle of a steering wheel included in the vehicle, or a steering wheel torque of the steering wheel.

In some implementations, the second set of weights are determined using the output from the air spring suspension system if the vehicle includes the air spring suspension system, and the second set of weights are determined using at least one of the difference between the vertical frequency values and the roll frequency value, the height change, the tire pressure change, or the relative wheel speed difference, if the vehicle does not include the air spring suspension system.

In an embodiment, a method comprises: receiving, by a processor, a first set of weights associated with a vehicle prior to a drive, the vehicle (1) including a plurality of axles and a plurality of wheels attached to the plurality of axles, and (2) not including an air spring suspension system; causing, by the processor, at least one first remedial action to be performed in response to at least one weight from the first set of weights being outside a predetermined range; determining, by the processor, longitudinal dynamics associated with the vehicle during the drive; determining lateral dynamics associated with the vehicle during the drive; determining, by the processor, a second set of weights associated with at least one axle from the plurality of axles during the drive based on at least one of: (1) a difference between a vertical frequency value and a roll frequency value provided by a frequency response function associated with a center of gravity of the vehicle during the drive, (2) a height change associated with the vehicle between a height prior to the drive and a height during the drive, (3) a tire pressure change between a tire pressure associated with the plurality of wheels prior to the drive and a tire pressure associated with the plurality of wheels during the drive, or (4) a relative wheel speed difference between at least one first wheel from the plurality of wheels and at least one second wheel from the plurality of wheels during the drive; determining, by the processor, if at least one second remedial action should be performed based on the longitudinal dynamics, the lateral dynamics, and the second set of weights; and in response to determining that the at least one second remedial action should be performed, causing, by the processor, the at least one second remedial action to be performed.

In some implementations, the vehicle is operating in an autonomous driving mode prior to the performing of the at least one second remedial action, and the at least one second remedial action initiates causing a driver of the vehicle to perform a series of tasks to cause the vehicle to operate in a manual driving mode if the driver performs the series of tasks.

In some implementations, the longitudinal dynamics are determined based on the first set of weights, a current speed of the vehicle, a current acceleration of the vehicle, and a grade of a road where the vehicle is travelling in during the drive.

In some implementations, the lateral dynamics are determined based on the first set of weights, a current speed of the vehicle, a current acceleration of the vehicle, a bank angle of a road where the vehicle is travelling in during the drive, a roll angle of the vehicle, a steering wheel angle of a steering wheel included in the vehicle, and a steering wheel torque of the steering wheel.

In an embodiment, a method comprises: receiving, by a processor, a set of weights associated with a vehicle prior to a drive, the vehicle including a plurality of axles and a plurality of wheels attached to the plurality of axles; determining, by the processor, if at least one remedial action should be performed during the drive based on the set of weights and at least one of: (1) output from an air spring suspension system included in the vehicle indicating weights associated with the plurality of axles during the drive, (2) a difference between a vertical frequency value and a roll frequency value provided by a frequency response function associated with a center of gravity of the vehicle during the drive, (3) a height change associated with the vehicle between a height prior to the drive and a height during the drive, (4) a tire pressure change between a tire pressure associated with the plurality of wheels prior to the drive and a tire pressure associated with the plurality of wheels during the drive, or (5) a relative wheel speed difference between at least one first wheel from the plurality of wheels and at least one second wheel from the plurality of wheels during the drive; and in response to determining that the at least one remedial action should be performed, causing, by the processor, the at least one remedial action to be performed.

In some implementations, the vehicle is an autonomous vehicle weighing at least 26,000 pounds.

Some implementations further comprise determining dynamics of the vehicle during the drive, wherein: the dynamics are determined based on the set of weights, a current speed of the vehicle, a current acceleration of the vehicle, a bank angle of a road where the vehicle is travelling in during the drive, a roll angle of the vehicle, a grade of the road, and at least one of a steering wheel angle of a steering wheel included in the vehicle or a steering wheel torque of the steering wheel; and the dynamics are used in the determining of if the at least one remedial action should be performed.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A system comprising:
   a processor; and
   a memory operably coupled to the processor, the memory storing instructions that when executed cause the system to perform operations comprising:
   determining a first set of weights associated with at least one axle from a plurality of axles of a vehicle prior to a drive, the vehicle including a plurality of wheels attached to the plurality of axles, and a load, wherein the first set of weights includes an estimated weight of a left portion of the axle and an estimated weight of a right portion of the axle;
   determining a second set of weights associated with the axle from the plurality of axles during the drive based at least in part on the first set of weights determined prior to the drive, wherein the second set of weights includes an estimated weight of a left portion of the axle and an estimated weight of a right portion of the axle;
   determining if at least one remedial action should be performed based at least in part on a comparison between the estimated weight of the left portion and the estimated weight of the right portion of the axle of the second set of weights; and
   in response to determination of the at least one remedial action, changing operation of the vehicle from a first driving mode to a second driving mode.

2. The system of claim 1, wherein the at least one remedial action includes automatically decreasing a speed of the vehicle without requiring human input during the drive.

3. The system of claim 1, wherein the at least one remedial action includes automatically causing the vehicle to adjust at least one of longitudinal dynamics and lateral dynamics, without requiring human input.

4. The system of claim 1, wherein the at least one remedial action includes automatically navigating the vehicle to a predetermined safe location without requiring human input.

5. The system of claim 1, wherein the at least one remedial action includes alerting a driver of the vehicle via at least one of an audible notification, a visual notification, and a vibratory notification.

6. The system of claim 1, wherein the vehicle is operating in a manual driving mode prior to the performing of the at least one remedial action, and the at least one remedial action inhibits the vehicle from operating in an autonomous driving mode.

7. The system of claim 1, wherein the vehicle is an autonomous heavy truck.

8. The system of claim 1, wherein the determining if at least one remedial action should be performed is further based at least in part on longitudinal dynamics determined based on at least a portion of the first set of weights, a current speed of the vehicle, a current acceleration of the vehicle, and a grade of a road where the vehicle is travelling in during the drive.

9. The system of claim 1, wherein the determining if at least one remedial action should be performed is further based at least in part on lateral dynamics determined based on at least a portion of the first set of weights, a current speed of the vehicle, a current acceleration of the vehicle, and at least one of a bank angle of a road where the vehicle is travelling in during the drive, a roll angle of the vehicle, a steering wheel angle of a steering wheel included in the vehicle, and a steering wheel torque of the steering wheel.

10. The system of claim 1, wherein:
    the second set of weights are determined using the output from an air spring suspension system if the vehicle includes the air spring suspension system, and
    the second set of weights are determined using at least one of the difference between vertical frequency values and a roll frequency value, a height change, a tire pressure change, and a relative wheel speed difference, if the vehicle does not include the air spring suspension system.

11. The system of claim 1, wherein the determining a second set of weights is based on at least one of: i) a difference between a vertical frequency value and a roll frequency value provided by a frequency response function associated with a center of gravity of the vehicle during the drive, and ii) a height change associated with the vehicle between a height prior to the drive and a height during the drive.

12. The system of claim 1, wherein the determining a second set of weights is based on a relative wheel speed difference between at least one first wheel from the plurality of wheels and at least one second wheel from the plurality of wheels during the drive.

13. The system of claim 1, wherein the determining if at least one remedial action should be performed is further based on a difference between the estimated weight of the left portion of the axle and the estimated weight of the right portion of the axle exceeding a threshold difference value.

14. The system of claim 13, wherein, when the estimated weight of the left portion of the axle and the estimated weight of the right portion of the axle exceeds the threshold difference value, the at least one remedial action is not performed based on a feature of a road on which the vehicle is traveling.

15. A non-transitory computer-readable storage medium including instructions that, when executed by at least one processor of a computing system, cause the computing system to perform operations comprising:
  determining a first set of weights associated with at least one axle from a plurality of axles of a vehicle prior to a drive, the vehicle including a plurality of wheels attached to the plurality of axles, wherein the first set of weights includes an estimated weight of a left portion of the axle and an estimated weight of a right portion of the axle;
  determining a second set of weights associated with at the axle from the plurality of axles during the drive based at least in part on the first set of weights, wherein the second set of weights includes an estimated weight of a left portion of the axle and an estimated weight of a right portion of the axle;
  determining if at least one remedial action should be performed based at least in part on a comparison between the estimated weight of the left portion and the estimated weight of the right portion of the axle of the second set of weights; and
  in response to determination of the at least one remedial action, changing operation of the vehicle from a first driving mode to a second driving mode.

16. The non-transitory computer-readable medium of claim 15, wherein the vehicle is operating in an autonomous driving mode prior to the performing of the at least one second remedial action, and the at least one second remedial action initiates causing a driver of the vehicle to perform a series of tasks to cause the vehicle to operate in a manual driving mode if the driver performs the series of tasks.

17. The non-transitory computer-readable medium of claim 15, wherein the determining if at least one remedial action should be performed is further based at least in part on longitudinal dynamics determined based on the first set of weights, a current speed of the vehicle, a current acceleration of the vehicle, and a grade of a road where the vehicle is travelling in during the drive.

18. The non-transitory computer-readable medium of claim 15, wherein the determining if at least one remedial action should be performed is further based at least in part on lateral dynamics determined based on the first set of weights, a current speed of the vehicle, a current acceleration of the vehicle, a bank angle of a road where the vehicle is travelling in during the drive, a roll angle of the vehicle, a steering wheel angle of a steering wheel included in the vehicle, and a steering wheel torque of the steering wheel.

19. A computer-implemented method comprising:
  receiving, by a computing system, a set of weights associated with at least one axle from a plurality of axles of a vehicle prior to a drive, the vehicle including a plurality of wheels attached to the plurality of axles, wherein the set of weights includes an estimated weight of a left portion of the axle and an estimated weight of a right portion of the axle;
  determining, by the computing system, if at least one remedial action should be performed during the drive based at least in part on a comparison between an estimated weight of the left portion and an estimated weight of the right portion of the axle of a second set of weights during the drive, the second set of weights based on the set of weights; and
  in response to determination of the at least one remedial action, changing, by the computing system, operation of the vehicle from a first driving mode to a second driving mode.

20. The computer-implemented method of claim 19, further comprising determining dynamics of the vehicle during the drive, wherein
  the dynamics are determined based on the set of weights, a current speed of the vehicle, a current acceleration of the vehicle, a bank angle of a road where the vehicle is travelling in during the drive, a roll angle of the vehicle, a grade of the road, and at least one of a steering wheel angle of a steering wheel included in the vehicle and a steering wheel torque of the steering wheel, and
  the dynamics are used in the determining of if the at least one remedial action should be performed.

* * * * *